United States Patent
El-Batawy

(10) Patent No.: US 11,968,283 B2
(45) Date of Patent: Apr. 23, 2024

(54) ELECTRICAL VEHICLE CHARGER COMMUNICATIONS AND CONTROL

(71) Applicant: HIS MAJESTY THE KING IN RIGHT OF CANADA, AS REPRESENTED BY THE MINISTER OF NATURAL RESOURCES, Ottawa (CA)

(72) Inventor: Shady El-Batawy, Oshawa (CA)

(73) Assignee: HIS MAJESTY THE KING IN RIGHT OF CANADA, AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 0 days.

(21) Appl. No.: 17/977,186

(22) Filed: Oct. 31, 2022

(65) Prior Publication Data

US 2023/0164244 A1   May 25, 2023

Related U.S. Application Data

(60) Provisional application No. 63/281,321, filed on Nov. 19, 2021.

(30) Foreign Application Priority Data

Nov. 19, 2021   (CA) .................................. CA 3139479

(51) Int. Cl.
G05B 19/05       (2006.01)
H04L 69/08       (2022.01)

(52) U.S. Cl.
CPC .............. *H04L 69/08* (2013.01); *G05B 19/05* (2013.01); *G05B 2219/15038* (2013.01)

(58) Field of Classification Search
CPC .......... B60L 53/67; B60L 53/68; B60L 53/00; H04L 69/08; H04L 69/12; H04L 12/66
See application file for complete search history.

(56) References Cited

U.S. PATENT DOCUMENTS 9,758,046 B2    9/2017  Harper et al.
10,682,918 B2   6/2020  Hell
(Continued)

OTHER PUBLICATIONS

Intesis, "OCPP to Modbus TCP&RTU Gateway", Aug. 6, 2021 (Year: 2021).*

(Continued)

*Primary Examiner* — Oscar A Louie
*Assistant Examiner* — Messeret F Gebre
(74) *Attorney, Agent, or Firm* — Burr & Forman LLP

(57) ABSTRACT

Systems and methods for controlling electric vehicle chargers using central control consoles for controlling and communicating with industrial equipment. The electric vehicle chargers operate as clients in a client-server configuration with a dedicated OCPP server. The OCPP server communicates with a control console using either of two communications paths—one path uses a direct HTTP connection with the control console. For this path, the control console operates as a web-enabled client. For the other path, multiple communications protocols are used and conversions between these protocols are effected using a conversion module and a MODBUS server. The MODBUS server communicates with the OCPP server. The MODBUS server also communicates with the control console by way of the conversion module and a control server. The control console is thereby able to control multiple pieces of industrial equipment along with the electric vehicle chargers without needing to be compliant with the OCPP protocol.

11 Claims, 1 Drawing Sheet

(56) References Cited

U.S. PATENT DOCUMENTS

| | | | |
|---|---|---|---|
| 10,836,274 B1 | 11/2020 | Sun et al. |
| 10,926,644 B1 | 2/2021 | Wilson |
| 10,926,659 B2 | 2/2021 | Lee et al. |

OTHER PUBLICATIONS

Villekr, "Towards Event-Based Serverless OCPP Backend System: Part I—Motivation and Architecture Options", Jul. 26, 2021 (Year : 2021).*

Tuwien "openKB4BMS—A Semantic BMS Server", Oct. 28, 2017 (Year: 2017).*

S. Orcioni, L. Buccolini, A. Ricci and M. Conti, "Electric Vehicles Charging Reservation Based on OCPP," 2018 IEEE International Conference on Environment and Electrical Engineering and 2018 IEEE Industrial and Commercial Power Systems Europe (EEEIC / I&CPS Europe), Palermo, Italy, 2018, pp. 1-6. (Year: 2018).*

A. Kovacs, D. Marples, R. Schmidt and R. Morsztyn, "Integrating EVs into the Smart-Grid," 2013 13th International Conference on ITS Telecommunications (ITST), Tampere, 2013, pp. 413-418, doi: 10.1109/ITST.2013.6685582 (Year: 2013).*

F. Lehfuß, M. Nohrer, E. Werkman, J. A. Lópezz and E. Zabalaz, "Reference architecture for interoperability testing of Electric Vehicle charging," 2015 International Symposium on Smart Electric Distribution Systems and Technologies (EDST), Vienna, Austria , 2015, pp. 341-346 (Year: 2015).*

M. Faschang, M. Nohrer, J. Stockl and F. Kupzog, "Extensible co-simulation framework for electric vehicle charging Infrastructure testing," 2014 IEEE International Conference on Smart Grid Communications (SmartGridComm), Venice, Italy, 2014, pp. 182-187.

* cited by examiner

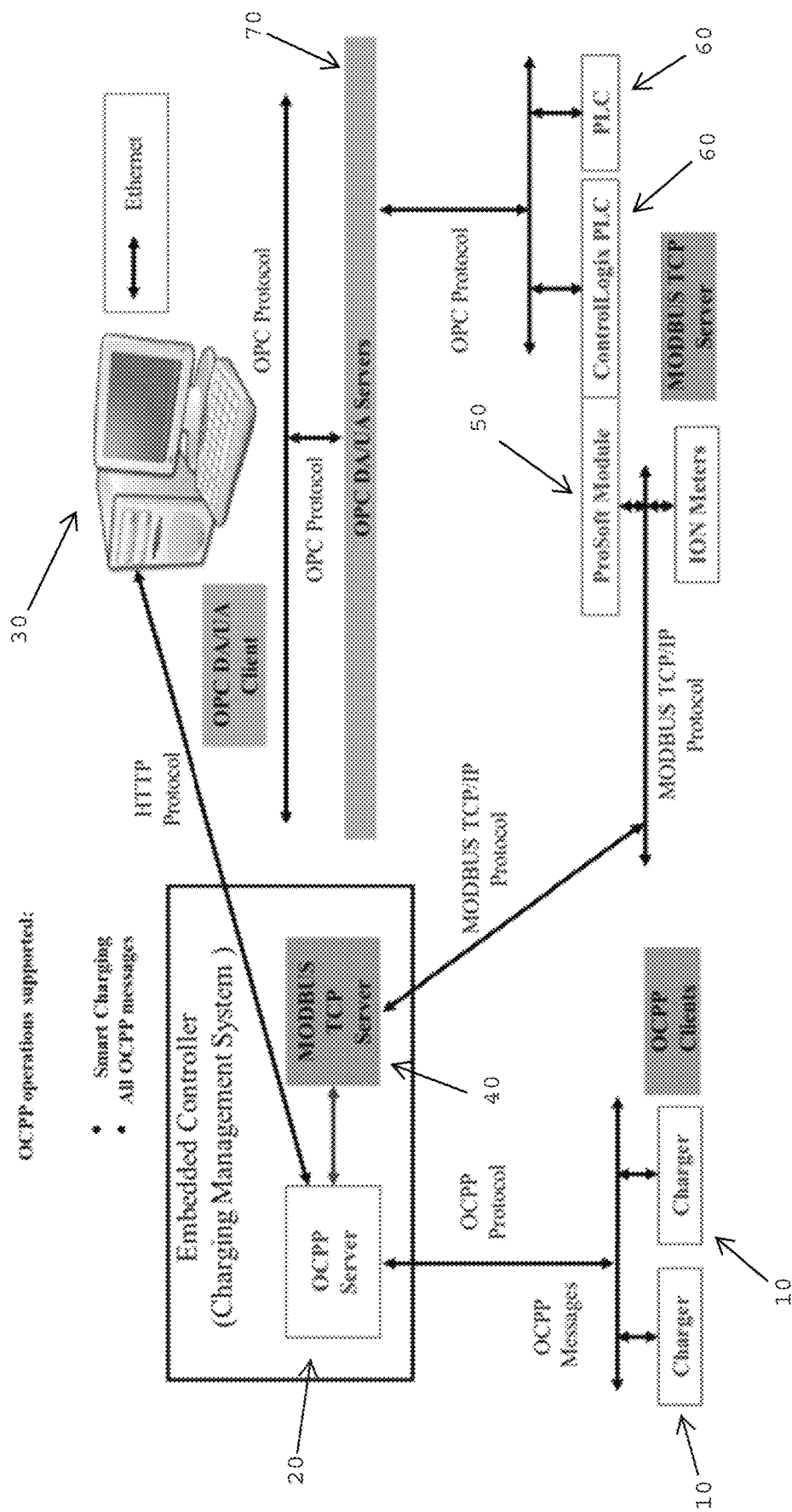

ELECTRICAL VEHICLE CHARGER COMMUNICATIONS AND CONTROL

CROSS-REFERENCE TO RELATED APPLICATIONS

This application claims priority to U.S. Provisional App. No. 63/281,321, filed on Nov. 19, 2021, entitled "ELECTRIC VEHICLE CHARGER COMMUNICATIONS CONTROL", and Canadian App. No. 3,139,479, filed on Nov. 19, 2021, entitled "ELECTRIC VEHICLE CHARGER COMMUNICATIONS AND CONTROL", the entire disclosures of which are hereby incorporated by reference.

TECHNICAL FIELD

The present invention relates to interoperations between industrial equipment systems. More specifically, the present invention relates to systems and methods for allowing electric vehicle charging systems to be controlled using existing protocols for industrial equipment control.

BACKGROUND

The current concerns about climate change and general concerns about environmentally friendly technologies have given rise to the ever-widening use of electric vehicles. One potential issue with such electric vehicles is their need to be charged. For efficient charging of some electric vehicles, specific charging profiles or specific charging schemes are preferably used.

Such electric vehicles are increasingly being used in industrial contexts as more and more industries switch from internal combustion vehicles to such electric vehicles. As can be imagined, to take advantage of efficiencies, specific electric vehicles are preferably charged using the above noted charging profiles or charging schemes. To further take advantage of efficiencies and to allow for centralized control of industrial equipment, there is a desire to control the charging of such electric vehicles using pre-existing equipment and pre-existing software and communications protocols. Such a capability would allow one or more central control consoles to control most equipment in an industrial setting.

Smart charging of battery electric vehicles enables remote monitoring, starting, stopping and control of the charging session process. A smart charging system mainly consists of a (fleet) of charging station(s), a central system (backend software) and a communication system between them. Most of the new electric vehicle charging stations are compliant with the Open Charge Point Protocol (OCPP). However, industrial control systems, which monitor/control all the field devices (e.g., variable speed drives, ION meters) through OPC DA/UA Servers, lack compatibility with the OCPP Protocol. By consequence, a direct control of charging stations using the OPC DA/UA Servers is not possible.

There is therefore a need for systems and methods that allow for the interoperability between the various communications and control protocols used for industrial equipment. Preferably, such systems and methods allow for central control consoles to communicate with and control existing industrial equipment such as motors, drives, and programmable logic controllers while also communicating with and controlling all aspects of electric vehicle chargers.

SUMMARY

The present invention provides systems and methods for controlling electric vehicle chargers using central control consoles for controlling and communicating with industrial equipment. The electric vehicle chargers operate as clients in a client-server configuration with a dedicated OCPP server. The OCPP server communicates with a control console using either of two communications paths—one path uses a direct HTTP connection with the control console. For this path, the control console operates as a web-enabled client. For the other communications path, multiple communications protocols are used and conversions between these protocols are effected using a conversion module and a MODBUS server. The MODBUS server communicates with the OCPP server. The MODBUS server also communicates with the control console by way of the conversion module and a control server. The control console is thereby able to communicate with and control multiple pieces of industrial equipment along with the electric vehicle chargers without needing to be compliant with the OCPP protocol.

In a first aspect, the present invention provides a system for controlling a plurality of chargers for electric vehicles, the system comprising:
- a first module for communicating with said plurality of chargers using a first communications protocol, said first module also being for communicating with a controller component using a second communications protocol;
- a second module for communicating with a controller server using a third communications protocol, said controller server being for controlling a plurality of industrial equipment using a fourth communications protocol;
- a conversion module for converting communications between said third communications protocol and said fourth communications protocol, said conversion module being coupled to a piece of industrial equipment, said piece of industrial equipment receiving control commands from said controller server using said fourth communications protocol;

wherein
- said first communications protocol is for controlling said chargers;
- said second communications protocol is for communicating with web-enabled clients;
- said controller component communicates with said controller server using said fourth communications protocol and said controller component is for controlling said plurality of industrial equipment through said controller server;
- said first and second modules communicate with each other to pass commands and data between one another to thereby pass said commands and data to and from said chargers.

In one embodiment, the first communications protocol is an Open Charge Point Protocol (OCPP) communications and control protocol. In some implementations, the second communications protocol is a Hypertext Transfer Protocol (HTTP). The third communications protocol may be a MODBUS TCP/IP communications and control protocol while the fourth communications protocol may be an Open Platform Communications (OPC) communications and control protocol.

In a second aspect, the present invention provides a system for controlling a plurality of chargers for electric vehicles, the system comprising:
- a first module for communicating with said plurality of chargers using a first communications protocol, said first module also being for communicating with a controller component using a second communications protocol;
a second module for communicating with a controller server, said controller server being for controlling a plurality of industrial equipment;
wherein
said first communications protocol is for controlling said chargers;
said second communications protocol is for communicating with web-enabled clients;
said controller component communicates with said controller server and said controller component is for controlling said plurality of industrial equipment through said controller server;
said first and second modules communicate with each other to pass commands and data between one another to thereby pass said commands and data to and from said chargers.

In another aspect of the present invention, the controller component may communicate with the controller server and with the plurality of industrial equipment using a communications protocol different from the first and second communications protocol. As well, the second module may communicate with the controller server using a communications protocol different from the first and second communications protocol.

BRIEF DESCRIPTION OF THE DRAWINGS

The embodiments of the present invention will now be described by reference to the following FIGURE, in which identical reference numerals in different figures indicate identical elements and in which:

FIG. 1 is a schematic diagram illustrating one aspect of the present invention.

DETAILED DESCRIPTION

In one aspect, the present invention allows for multiple communications paths between electric vehicle chargers and a control console. These communications paths allow for commands and data to pass between the vehicle chargers and the control console. It should be clear that the control console not only controls the electric vehicle chargers but also other industrial equipment such as programmable logic controllers as well as motors and the like.

In another aspect of the present invention, the different communications paths involve multiple communications protocols as well as command and control protocols. One implementation of the present invention is schematically illustrated in FIG. 1. As can be seen in FIG. 1, a number of electric vehicle chargers 10 communicate with a first module 20 using a first communications protocol. The first module 20 then communicates directly with a control console 30 using a second communications protocol to pass commands and/or data between the control console 30 and the chargers 10. It should be clear that the control console generally communicates with and controls industrial equipment using a communications protocol that is different from the first or second communications protocols. The communications path from the chargers to the first module and then directly from the first module to the control console represents a first communications path to and from the control console to and from the electric vehicle chargers.

The second communications path from the electric vehicle chargers to the control console is not as direct. This second communications path runs from the electric vehicle chargers to the first module 20 and then from the first module 20 to a second module 40. The first and second modules exchange commands and/or data as necessary. The second module 40 then communicates with a conversion module 50. Communications between the second module 40 and the conversion module 50 are conducted using a third communications protocol. The conversion module 50 converts communications and data between the third communications protocol and a fourth communication protocol. This fourth communications protocol is used to pass commands and/or data between industrial equipment 60 and control servers 70. The control servers 70 also pass communications and/or data between itself and the control console 30 using the fourth communications protocol.

As can be seen, the first communications path is more direct and allows commands and data to be passed between the electric vehicle chargers and the control console 30. Alternatively, a different path for the same commands and data can be used. This second communications path would route the commands and/or data from the chargers to the first module and then to the second module. The second module then passes the commands and data to the conversion module and then to the control servers. From the control servers, the commands and/or data is passed to the control console.

As can be seen from FIG. 1, in one implementation, the first communications protocol is the OCPP protocol. This is used to pass commands/data to/from the electric vehicle chargers (operating as OCPP clients) to/from the first module that operates as an OCPP server. The second communications protocol, the one used by the first module to communicate with a control console, is the well-known HTTP communications protocol. As is well-known, the HTTP communications protocol is mostly used to communicate between web browsers (clients) and web sites (servers). As can also be seen, the control console, in this implementation, operates as an OPC DA/UA client.

For the second communications path, in this implementation, the third communications protocol is the MODBUS TCP/IP protocol while the fourth communications protocol is the OPC protocol. In one implementation, the conversion module 50 converts commands and data between the OPC protocol and the MODBUS TCP/IP protocol. Such a conversion module, in this implementation, operates as an add-on/card coupled to a piece of industrial equipment. For this implementation, the equipment is a programmable logic controller. Such a conversion module may be an add-on peripheral (e.g. a device/add-on from ProSoft Technology such as the PLX32-EIP-MBTCP-UA or a similar device with similar capabilities). Of course, other configurations for the second communications path are also possible. Further information regarding a possible conversion module may be found at https://www.prosoft-technology.com/Products/Gateways/PLX3x/PLX32/EtherNet-IP-to-Modbus-TCP-IP-to-OPC-UA-Server-Gateway. The entirety of the contents of the above website is hereby incorporated herein by reference.

It should be clear that, for the second communications path, the first and second modules communicate with each other. The first module would be configured to be able to read/write to the second module.

For a better understanding of the different protocols being used and the issues being addressed by the various aspects of the present invention, the following references may be consulted:

MODBUS specification: http://modbus.org

OPC Foundation: http://opcfoundation.org

HTTP protocol: https://developer.mozilla/org/en-US/docs/Web/HTTP/Overview

OCPP protocol: https://www.openchargealliance.org/protocols/ocpp-201/

The entirety of the contents of the referenced websites noted above is hereby incorporated herein by reference.

It should be clear that the various aspects of the present invention can be implemented using mostly off-the-shelf components. However, care should be taken when implementing the various functions of the system. For the OCPP server (the first module), this component interacts with the electric vehicle chargers that function as OCPP clients. To trigger the different OCPP messages for the various components of the system, readily available OCPP modules and libraries can be used. To allow communications between the control console and the electric vehicle chargers, Websocket modules libraries may be used to establish a communications channel over TCP/IP between the chargers and the OCPP server. On the OCPP server side, a Flask/Websocket module and its associated libraries can be used to establish a web-based server on the OCPP server. This will allow the control console to use HTTP/HTTPS GET and POST requests to this web server. The web server can then interface with the rest of the control console to provide a user using the console with suitable control functions to control the electric vehicle chargers.

Regarding the MODBUS server that operates as the second module, this may be implemented using the MODBUS module and its associated MODBUS libraries to establish a communications channel to the conversion module. This may be implemented over a TCP/IP channel. Once the conversion module is communicating with the MODBUS server, the communications can be converted by the conversion module into OPC protocol communications to be passed on to the OPC protocol-compliant control servers and subsequently to the control console.

For greater clarity, robustness, and cybersecurity purposes, the various components illustrated in FIG. 1 communicate with one another using an Ethernet network.

It should be noted that, while FIG. 1 illustrates a system with two communications paths from the electric vehicle chargers to the control console, either of these communications paths may be implemented by itself. Thus, each communications path can operate and exist absent the other communications path. In some implementations, only the first communications path is feasible while, in other implementations, only the second communications path is feasible. Thus, the implementation may depend on the circumstances and environments in which the invention is to be used.

In another aspect of the present invention, the concept of the invention can be generalized to that of using a dedicated server/conversion server to convert communications and data from one protocol into another to thereby allow a control console to control electric vehicle chargers. Such a conversion server would allow for smart charging of the chargers to occur and would allow for different charging profiles to be used.

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

The invention claimed is:

1. A system for controlling a plurality of chargers for electric vehicles, the system comprising:
- a first server comprising an Open Charge Point Protocol (OCPP) server, said server being for communicating with said plurality of chargers using a first communications protocol, said first server also being for communicating with a controller component using a second communications protocol;
- a second server comprising a MODBUS TCP/IP server, said second server being for communicating with a controller server using a third communications protocol, said controller server being for controlling a plurality of industrial equipment using a fourth communications protocol; and
- a conversion module comprising a programmable logic controller (PLC), said conversion module being for converting communications between said third communications protocol and said fourth communications protocol, said conversion module being coupled to a piece of industrial equipment;
- said piece of industrial equipment receiving control commands from said controller server using said fourth communications protocol;
- wherein said first communications protocol is for controlling said plurality of chargers;
- said second communications protocol is for communicating with web-enabled clients;
- said controller component communicates with said controller server using said fourth communications protocol and said controller component is for controlling said plurality of industrial equipment through said controller server; and
- said first server and said second server communicate with each other to pass commands and data between one another to thereby pass said commands and data to and from said plurality of chargers;
- wherein said first communications protocol is an Open Charge Point Protocol (OCPP) communications and control protocol;
- wherein said third communications protocol is a MODBUS TCP/IP communications and control protocol;
- wherein said fourth communications protocol is an Open Platform Communications (OPC) communications and control protocol.

2. The system according to claim 1, wherein said second communications protocol is a Hypertext Transfer Protocol (HTTP).

3. The system according to claim 2, wherein said controller component comprises a web client for communicating with said first server by way of standard web server commands.

4. The system according to claim 1, wherein said industrial equipment includes programmable logic controllers.

5. The system according to claim 1, wherein said controller server comprises at least one OPC DA/UA server.

6. The system according to claim 5, wherein said controller component is an OPC DA/UA client.

7. A system for controlling a plurality of chargers for electric vehicles, the system comprising:
- a first server comprising an Open Charging Point Protocol (OCPP) server, said first server being for communicating with said plurality of chargers using a first communications protocol, said first server also being for communicating with a controller component using a second communications protocol; and
- a second server comprising a MODBUS TCP/IP server, said second server being for communicating with a controller server using a third communications protocol, said controller server being for controlling a plurality of industrial equipment using a fourth communications protocol; and
- wherein said first communications protocol is for controlling said plurality of chargers;
- said second communications protocol is for communicating with web-enabled clients;
- said controller component communicates with said controller server and said controller component is for controlling said plurality of industrial equipment through said controller server; and
- said first server and said second server communicate with each other to pass commands and data between one another to thereby pass said commands and data to and from said plurality of chargers;
- wherein said first communications protocol is an Open Charge Point Protocol (OCPP) communications and control protocol;
- wherein said third communications protocol is a MODBUS TCP/IP communications and control protocol;
- wherein said fourth communications protocol is an Open Platform Communications (OPC) communications and control protocol.

8. The system according to claim 7, wherein said controller component communicates with said controller server and with said plurality of industrial equipment using a communications protocol different from said first and second communications protocols.

9. The system according to claim 7, wherein said second server communicates with said controller server using a communications protocol different from said first and second communications protocols.

10. The system according to claim 7, wherein said second communications protocol is a Hypertext Transfer Protocol (HTTP).

11. The system according to claim 7, wherein a conversion module comprising a programmable logic controller (PLC) is used in said system to convert between communications protocols other than said first and second communications protocols.

* * * * *